United States Patent [19]

Knuth et al.

[11] Patent Number: 5,197,093
[45] Date of Patent: Mar. 23, 1993

[54] ENVIROMENTAL ADAPTIVE MECHANISM FOR CHANNEL UTILIZATION IN CORDLESS TELEPHONES

[75] Inventors: Stephen B. Knuth, Mission Viejo; Oded Yossifor, Torrance; Kenneth R. Core, Cypress, all of Calif.

[73] Assignee: PhoneMate, Inc., Torrance, Calif.

[21] Appl. No.: 686,018

[22] Filed: Apr. 12, 1991

Related U.S. Application Data

[63] Continuation-in-part of Ser. No. 508,663, Apr. 13, 1990, abandoned.

[51] Int. Cl.$^5$ .................. H04M 11/00; H04Q 7/00; H04B 00/00
[52] U.S. Cl. ............................ 379/61; 379/63; 379/58; 379/56; 455/34.1; 455/161.1; 455/165.1
[58] Field of Search ............ 379/59, 61, 62, 63, 379/58, 56; 455/34, 36, 76, 77, 161, 165, 167, 179

[56] References Cited

U.S. PATENT DOCUMENTS

| | | | |
|---|---|---|---|
| 3,806,819 | 4/1974 | Leonard | 455/179 |
| 4,198,605 | 4/1980 | Yamashita et al. | 455/161 |
| 4,461,036 | 7/1984 | Williamson et al. | 455/165 |
| 4,768,219 | 8/1988 | Yamagata et al. | 379/61 |
| 4,768,220 | 8/1988 | Yoshihara et al. | 379/63 |
| 4,783,844 | 11/1988 | Higashiyama et al. | 455/34 |
| 4,955,073 | 9/1990 | Sugayama | 455/161 |
| 4,989,231 | 1/1991 | Ishikawa | 379/59 |
| 5,038,399 | 8/1991 | Bruckert | 455/33 |
| 5,044,010 | 8/1991 | Freikiel et al. | 379/61 |

OTHER PUBLICATIONS

JC Penny Catalog, Copyright 1989, p. 708 #1 and #2.

*Primary Examiner*—Curtis Kuntz
*Assistant Examiner*—William D. Cumming
*Attorney, Agent, or Firm*—Lewis Anten

[57] ABSTRACT

A cordless telephone has an improved mechanism for scanning and selecting channels by adapting to the channel usage patterns of the local environment in which it is placed. This results in a prioritized list of channels that have the highest probability of being available, free from interference. By prescanning the channels during the idle time of the cordless telephone, power usage of the handset is minimized and quick acquisition of an available channel becomes possible.

10 Claims, 3 Drawing Sheets

ENVIROMENTAL ADAPTIVE MECHANISM FOR CHANNEL UTILIZATION IN CORDLESS TELEPHONES

This application is a continuation-in-part of application Ser. No. 07/508,663, filed Apr. 13, 1990, now abandoned.

BACKGROUND

Cordless telephones which are capable of operating on more than one channel are well known. These products range in capability from a relatively simple two-channel crystal controlled design to the more sophisticated frequency synthesized techniques, which permit either manual channel changing or full scanning operation. In spite of its adding a significant cost burden to the product, multiple channel operation is the only effective method for dealing with channel interference that may be caused by other users of cordless telephones in the local vicinity or other electro magnetic sources of interference. This is particularly significant in highly urbanized areas where many cordless telephones and other electronic devices are used.

The functioning of cordless telephones in the United States is constrained by having to operate in one of ten channels within a relatively narrow frequency band width set by the FCC. In most urban environments, this may result in interference on one or more channels. Existing techniques for dealing with interference range from manually changing the channel of operation to using automatic frequency selection, depending on the individual model.

Manual channel selection begins with the recognition by the user that the symptoms being experienced are in fact interference related. In many instances, this can be far from obvious. Symptoms such as misdialing can be caused by interference, even in those models that have digital security codes. A trial-and-error process is typically used to find a new channel that is not subject to interference. For a two-channel product this can be relatively brief but has a corresponding low probability of success, particularly in urban environments where there is a very good chance that any two of the ten available channels will be used simultaneously by other cordless units in the neighborhood. For a ten-channel product, the chances of eventually finding a clear channel are good, however, the process of finding a clear channel can be tedious.

An improvement is realized in products which automatically scan all ten channels every time the cordless telephone is used. This makes the entire spectrum available to the user and ensures that all communication will at least start on a clear channel. Significant problems still remain, however. Users of this type of system will immediately notice annoying delays in common operation. Lapses of several seconds may occur between placing the unit in the "Talk" mode and obtaining a dial tone or being able to begin a conversation. The principal reason for this is simply that scanning ten channels takes time. To overcome this serious limitation, a more selective channel scanning method has been proposed in the prior art.

In the patent to Yamagato et al., U.S. Pat. No. 4,768,219, the cordless telephone units, that is the handset and the base, independently scan all the channels during the standby mode and store in their respective memories three of those channels that have interference. When an outgoing call is thereafter to be made, or an incoming call is received, the unit skips those channels that are stored in either the memories of the base or handset and searches for a vacant channel, whereupon communication is established between the handset and the base.

Though the method disclosed in Yamagato is a definite improvement over scanning all ten channels, it too has serious draw backs. Even though the handset scans the frequency spectrum almost continuously, it begins its actual search for a vacant channel only when an incoming call is received or when an outgoing call is about to be made. Depending on the distribution of the vacant channels, this could cause considerable delay. Also, it does not discriminate between a channel that experiences interference less frequently than another channel. In most urban environments, it is not unrealistic to expect some channels to be used very frequently, some to be used sporadically and some very rarely. The device of Yamagato is therefore perfectly capable of selecting the same channel that a neighbor's cordless phone uses, as long as it is not in use at the exact moment of scanning, even if the other six channels are completely unutilized.

Another serious disadvantage of the Yamagato device is that the handset and the base may each attempt to communicate on channels that have been marked by the other as being noisy. This could happen because the handset and the base keep different channel storage areas (A1, A2, A3 in the handset and A1, A2, and A3 in the base). Also, the system's continuous scanning results in the reduction of handset battery life. This is due to the fact that the handset receiver must be powered up 100% of the time. It does not learn or adapt to the channel usage patterns of its environment.

SUMMARY OF THE PRESENT INVENTION

The present invention uses a scanning procedure in conjunction with statistical analysis of the channel interference patterns on given channels to give the cordless telephone the ability to select the channels of communication very efficiently, without the previously discussed disadvantages. It continuously adapts to the environment in which it is placed.

The present invention uses the system's idle time to survey and store in memory, channel usage or other source of interference by others in the local area. It uses this information to make an intelligent choice of frequency for its own use. As soon as the unit is plugged in by the consumer, it will scan each of the channels and begin to record usage and interference and keep a running "score" for each channel in memory. This information is updated periodically. The base and the handset will agree, based upon accumulated channel scores, what frequency to use when they are separated, along with a prioritized choice of several alternative channels in case the primary channel is busy at that time. This means that the system is always in a position to be ready, in advance of actual use, to choose a clear channel to operate on if one can be found, and if not, it will choose the channel having a record of being the next least used channel, based on long term statistics specific to the local environment stored in memory. Thus, the system is able to choose the channels with the highest probability of being free from interference.

Since the sampling process is continuous, each channel being scanned every ten minutes, the system will automatically "migrate" to a new preferred channel from a prior preferred channel if a neighbor should subsequently bring home a device that generates interference, such as a cordless phone, baby monitor, remote controlled toy, etc., which in the United States have the same frequency allocation as the cordless telephone. This ability to avoid the neighbor's channel also serves to enhance the privacy of conversation. Conversely, if a channel that was previously found to have interference develops a pattern of becoming clear, the system recognizes it quickly and begins to use it when necessary.

The problems associated with delay and low battery life are therefore resolved satisfactorily. Since the base and handset have pre-arranged the channel of operation, ten channel scanning at critical moments of operation is no longer necessary. This means that the handset receiver can resume a predominant "sleep" mode during standby, keeping current requirements to the minimum.

It is to be noted that all of this is accomplished in a manner that is completely transparent to the user, not requiring any intervention by the user. The resultant speed of access, ease of operation, reduction in environmental and use-related interference, greatly enhances the operation of the cordless telephone.

OBJECTS OF THE INVENTION

It is an object of the present invention to provide a channel selection and utilization mechanism for cordless telephones that learns channel usage patterns of the environment and adapts to it.

It is another object of the present invention to provide a channel selection and utilization mechanism for cordless telephones that prioritizes channels and stores them in a weighted order for preferential access.

It is another object of the present invention to provide a novel method of assessing the relative quality of scanned channels.

It is another object of the present invention to provide a channel selection and utilization mechanism for cordless telephones that is simple to use.

It is still another object of the present invention to provide a channel selection and utilization mechanism for cordless telephones that does not require manipulation by the user.

It is an object of the present invention to provide a channel selection and utilization mechanism for cordless telephones that optimizes the selection of an interference free channel in order to balance the need for channel fast access and the need to conserve the battery life of the handset.

These and other objects and advantages of the present invention will become apparent from a review of the specification and accompanying drawings.

DESCRIPTION OF THE PREFERRED EMBODIMENTS

Figure 1:
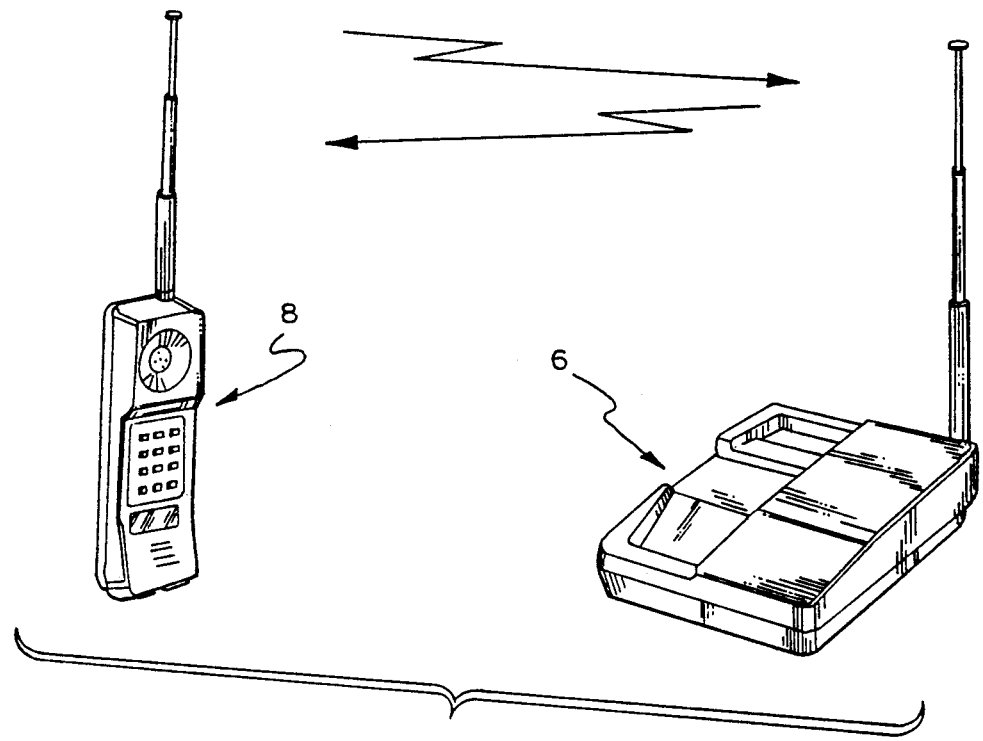
FIG. 1 is a general perspective view of a cordless telephone.
Figure 2:
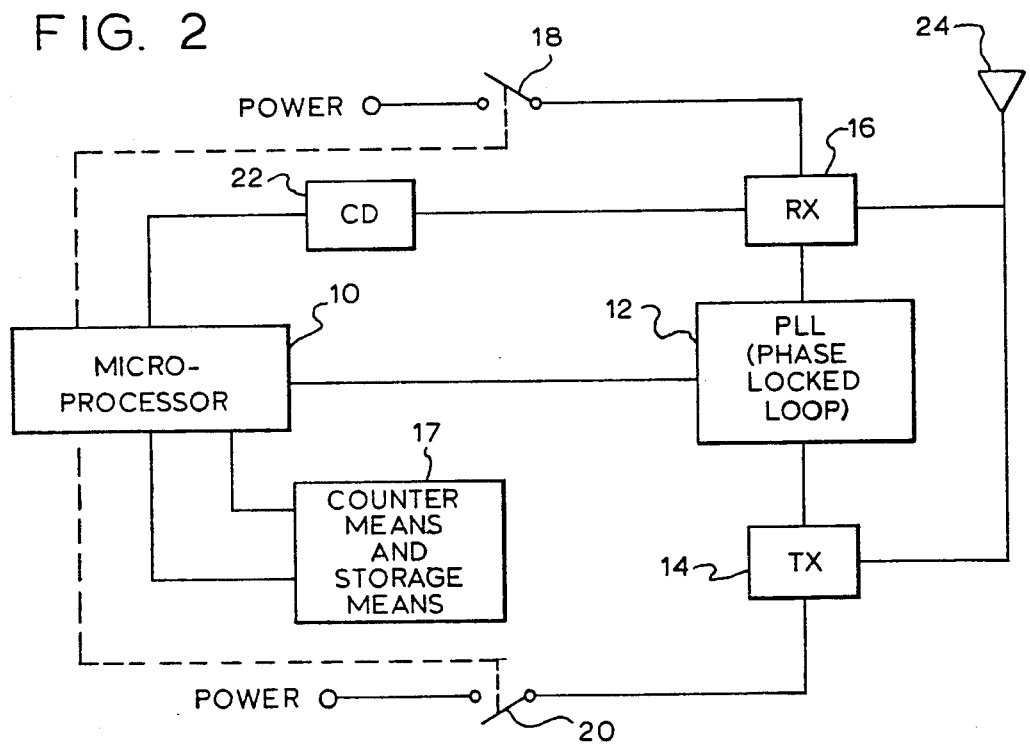
FIG. 2 is a schematic representation of the control circuitry.

The detailed operation of a cordless telephone of the present invention is well known and will not be repeated here. In simplest terms and as shown in FIG. 1, the Cordless Telephone consists of a base unit 6 connected to the telephone line and a power supply, and a portable handset 8. A portable handset 5 allows audio connection to the telephone line via a radio link. The base unit 6 and the handset 8 each have a transmitter 14 and a receiver 16 for communicating with one another. A general block diagram of the control circuitry of a multichannel cordless telephone is shown in FIG. 2. This circuitry would be effectively duplicated in the base 6 and in the handset 8. Other circuitry, such as the telephone line interface on the base, the microphone and earpiece circuits on the handset are well known and will not be discussed here.

A microprocessor 10 provides basic control of the unit and implements a scanning algorithm through its internal logic. The microprocessor 10 controls the PLL 12, which determines the operating frequency of the transmitter 14 and receiver 16. The microprocessor 10 is connected to and manipulates the contents of the counter means and the storage means 17. The microprocessor 10 is also able to disconnect the power connections 18 and 20 to the receiver 16 and transmitter 14 circuits. This allows reduction of power consumption by only momentarily sampling the signal present on the receiver 16. For example, if it takes 0.1 sec to sample a given channel, and three channels are to be scanned the receiver can be turned on for only 30% of the time. The microprocessor 10 senses the presence of carrier signal (or an interference source) through its Carrier Detect (CD) 22 input. The signal is transmitted between the handset 8 and the base unit 6 through the antenna 24.

The operation of the present invention does not depart from the conventional cordless telephone other than in the means for selecting the channel to be used by the cordless telephone when engaged.

Figure 3:
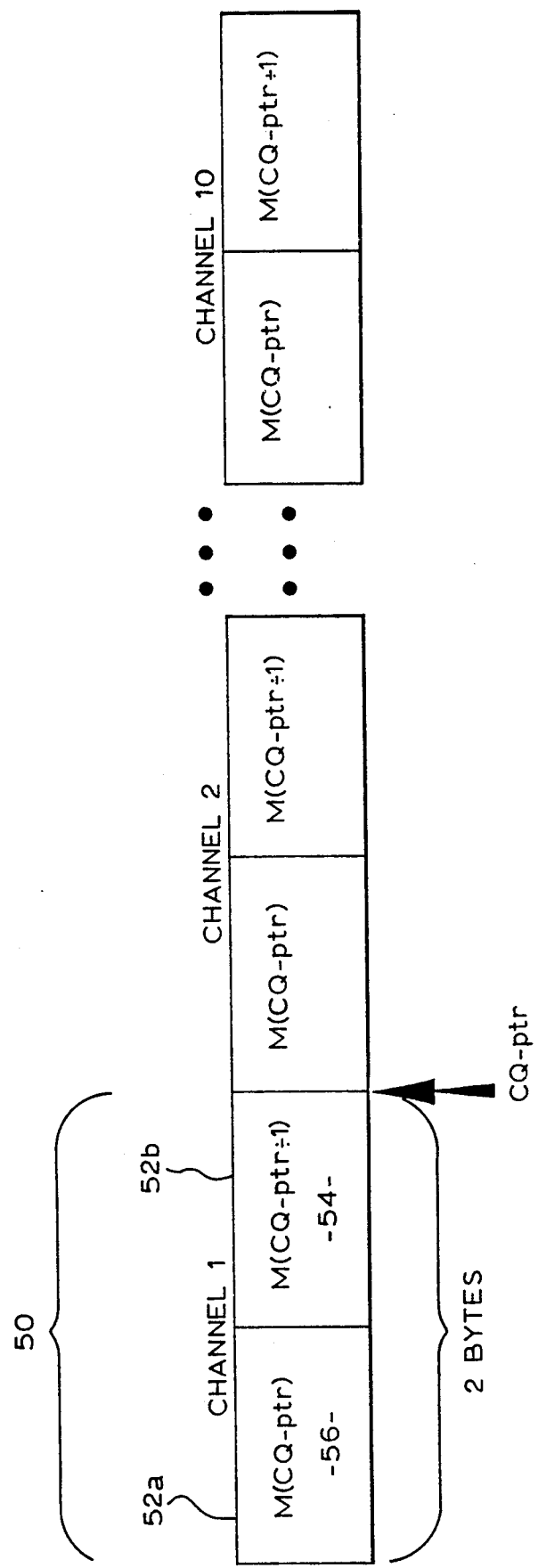
FIG. 3 represents the channel storage scheme in memory.
Figure 4:
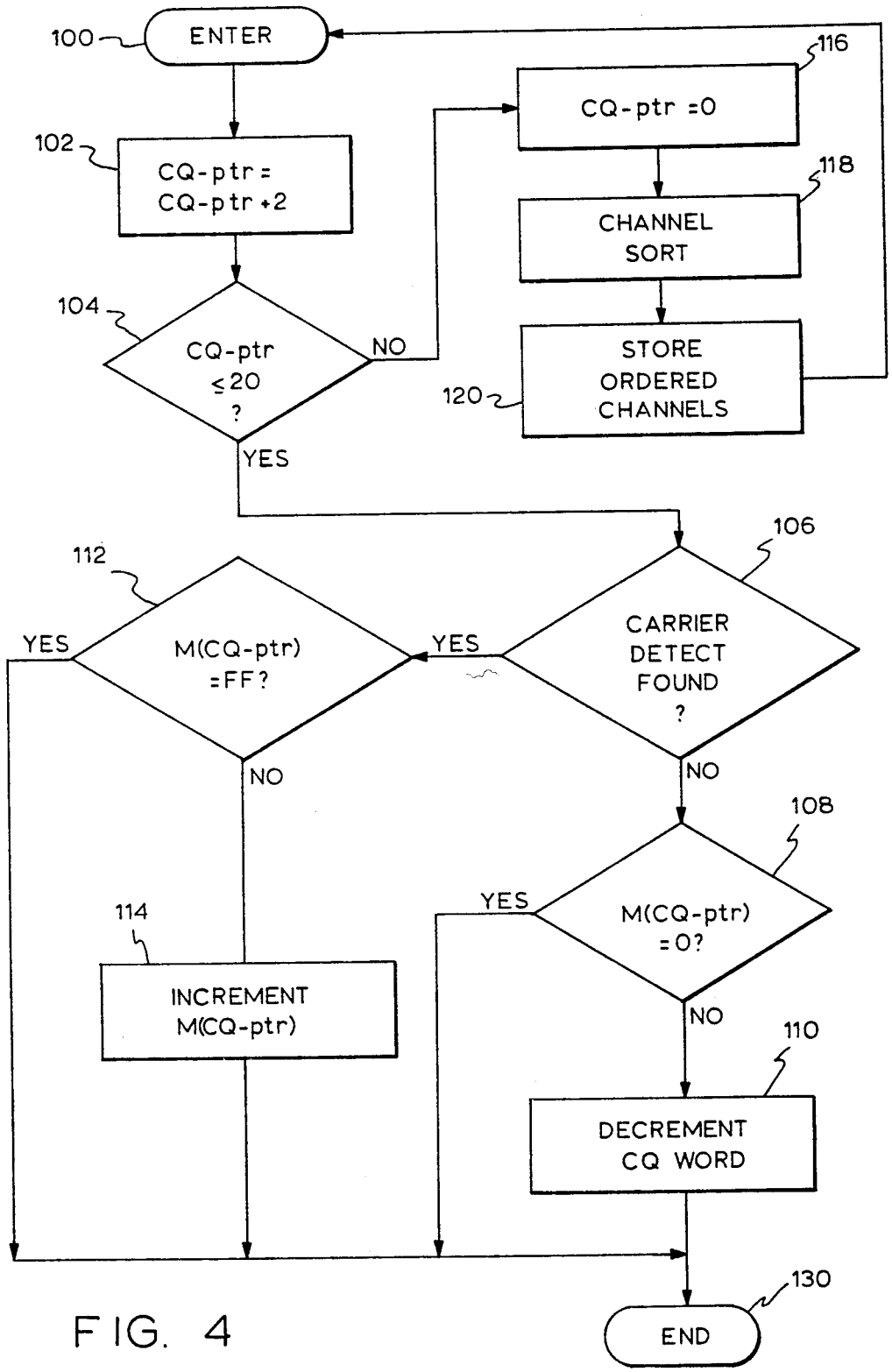
FIG. 4 is a flow chart illustrating the logic of the present invention.

With reference to FIGS. 3 and 4, the channel selector operation is described. During the standby mode of the cordless telephone, the channel spectrum is scanned at the rate of one channel every minute. In the scanning process, the microprocessor 10 tunes the receiver 16 through the PLL 12 to receive one of the available channels. A sample is taken of any signals (signifying interference) present on that tuned-in channel. The next channel's signal is then sampled when the microprocessor 10 selects the next channel by tuning the PLL 12 to that next channel's frequency or frequencies. This process is then repeated with channels being selected by the microprocessor 10, and samples of signals, if any, on those channels being taken to test for interference. The scan cycle time for all ten channels is 10 minutes. Therefore, each channel is scanned about 144 times a day and about 1,000 times a week. The record of interference and non interference of each channel found during the scanning is stored in memory 17, and given a preference, based on this record. The availability of a channel is determined by its cumulative history of interference. This is referred to as its Channel Quality.

Channel scanning circuitry is well known and can comprise the following. A receiver is present for reception of signals on the channels to be scanned. A tuner or tuners may be present to tune the channel scanner or receiver to different frequency bands, or channels. This tuning function may be accomplished by controlling a phase locked loop that determines the operating frequency of the receiver. Similarly, an adjustable capacitor may be used to control the resonance of a receiving circuit, thereby controlling the scanned frequency band. All three means for selecting a certain channel, or frequency band, are well known in the art.

Once the receiver is tuned to a frequency, signals incoming over the receiver of the selected frequency band may be analyzed for interference. By means of switching channels, or frequency bands, certain segments of the electromagnetic spectrum used for radio transmissions can be sampled and analyzed for the presence of interference, third party communications, or clarity over those channels.

By sampling the channels for signals, the cordless phone incorporating the present invention determines the presence or absence of interfering signals on the sampled channels. Any signal not generated by the cordless phone is interference so far as the cordless phone is concerned. When the cordless phone is not being used, that is when it is in standby or idle mode, any signal sufficient to trigger the Carrier Detect, or CD 22, of the cordless phone is by necessity interference as that signal would interfere with the transmission and reception of the cordless phone were it to start using that channel. If the signal from a scanned channel does not activate the CD, then the channel is clear and has no interfering signals.

In the present invention, while scanning channels and sampling for signals, or lack thereof, counters corresponding to each channel are respectively updated to numerically reflect the cumulative history of the presence or absence of interference on the channels. The means by which radio frequency channels are scanned or tuned-in, the means by which signals are sampled, and the means by which a counter is updated, are all known in the art. The present invention resides not in the specific means used to perform these functions, but in their coordinated use for the ultimate selection of clear channels for use by the cordless phone.

The present invention takes into consideration in its determining the quality of a channel that statistically it is more likely that a channel will be free at any given time when sampled than it will be busy. This is for the obvious reason that telephones are not used very much during the late evening and early morning times when people are usually asleep. Therefore, an instance of interference will have a higher value as an indication of poor quality than an absence of the interference.

A simple way of recognizing and dealing with such an imbalance is to use an algorithm that adds a higher value in the memory for an interference signal than would be subtracted for a non-interference signal. Another way of stating this is by saying that in order to weight the cumulative representation on a particular channel, a positive number of greater absolute value is added for each detected occurrence of interference, while a negative number of lesser absolute value is added for each detected absence of interference. For example, every instance of interference would result in the value 5 being added to the counter of the channel and every instance of finding no interference during the sample would result in the value of 1 being subtracted from the counter. The means used to change the count by incrementing or decrementing the counter are well known in the art, and include the microprocessor 10 of the cordless telephone implementing an algorithm through its internal logic. Such an algorithm may be stored in a ROM associated with the microprocessor 10.

While such a system is simple in concept, it would have the tendency, if there were a sufficiently large number of samples, to drive the entire system in one direction or the other. In either case, the ability to segregate one channel from the other would be reduced or eliminated so that the ability to select a channel would be lost.

In one embodiment of the algorithm, more sophisticated than the linear addition and subtraction system described above, a weighted addition and subtraction is used which has the tendency to avoid the channel counter from reaching maximums, and if it does reach a maximum, cause it to retreat at a faster rate than when it was at a lower value. Such a system is considered a non linear value system in that it decreases the channel quality count faster when the count is high, and at a slower rate when it is low. Such a system tends to drive the count toward the middle values of the Channel Quality count where the system is operative.

Referring to FIG. 3, the base unit 6 maintains a counter 50 for indicating the Channel Quality usage for each channel 52a and 52b. The Channel Quality is represented within each counter as a distinct CQ word for each channel. The value of CQ is an indicator of the activity or the interference in that channel. The greater the value of CQ for a specific channel, the greater the likelihood of interference, and conversely, the lower the CQ value for a specified channel, the greater the likelihood of the channel being clear and available for use.

The CQ is divided into a low byte (CQlo) 54 and a high byte (CQhi) 56, each consisting of several bits, the exact number to be determined by design considerations of the desired embodiment.

As an example, let us consider one such embodiment where CQlo and CQhi consist of 8 bits each. During the scanning operation, if a carrier or interference is detected on a particular channel being scanned, then 1 is added to the value of the corresponding CQhi byte until it reaches the maximum predetermined value of FF in the hexadecimal notation. If no carrier or interference is detected for a channel when scanned, then (CQhi+1) is subtracted from the prior CQ of that channel to arrive at the new CQ i.e., CQ(new)=(CQ−(CQhi+1)). As an example, if the CQ word was FF00 and no interference was detected, the new CQ value would be FE00 from the subtraction of 100 from FF00. Therefore, as the CQ count gets higher, the amount subtracted when no carrier or interference is detected on that channel, gets larger as well. The rationale behind such an implementation is that when a channel which might have experienced interference for a considerable length of time becomes clear, it becomes available for use within a reasonable time frame.

While we have shown one method that causes a rapid drop in the CQ count to enable faster access, it is emphasized that numerous other systems could be used to bring about the same or similar effect and all such methods would fall within the spirit and scope of the present invention. By adding and subtracting from the CQhi, rather than the CQlo, the system is more responsive to those changes.

While the above non linear system has been described in detail it is recognized that many other algorithms, linear and non linear can be employed. For example, the value of a interference or non interference signal can be dependant on the time of the day, an interference signal being of more significance during the night hours than the day hours. Also, with an appropriate timer the algorithm could keep track of the most likely available channel at particular times of the day. In the simplest mode the device would have a day operation and a different nighttime operation.

The operation of the scanning routine is shown in FIG. 4. The routine is entered at 100 once every minute during the standby mode of the cordless telephone. The Channel Quality pointer, CQ-ptr 102 is a pointer to the CQ counter of the channels and since each CQ word consists of two bytes (CQhi and CQlo), the increment of CQ-ptr+2 at 102 would move the pointer to the CQ counter of the next channel as shown by the arrow in FIG. 3. M(CQ-ptr) and M(CQ-ptr+1) are the values CQhi and CQlo, respectively. If at 104 the CQ-ptr has a value of less than 20, indicating there are more channels, the routine checks for the carrier detect 106. If a carrier detect 106 has been found, M(CQ-ptr) of the channel is checked 112 to see whether the cumulative value for the counter of that channel has reached the maximum count of FF. If it has, it means that the channel has been experiencing interference continuously and the routine ends 130. However, if the value of the counter M(CQ-ptr) has not reached the maximum value FF, the CQhi is incremented 114 by the value of 1 and the routine continues. If no carrier detect is encountered in the channel that is currently being scanned 106, the routine examines 108 the M(CQ-ptr) and if its value is zero, it means that the channel is clear and the routine ends. If no carrier is detected, but if the M(CQ-ptr) is not zero, CQ word is decremented by M(CQ-ptr)+1 at 110 and the routine CQhi.

If the CQ-ptr 104 reaches 20, it means that all the 10 channels have been scanned and therefore the CQ-ptr is set to zero 116 in order to begin the next scan cycle 100. The routine sorts the channels 118 of the CQ word values for all the channels and stores the sorted order of channel numbers in memory storage means 120 in an ordered channel list, so that the ones with the lower CQ values, clearer channels, are preferentially accessed or selected by channel selection means present in the handset 8 or base 10 upon activation of the cordless telephone. One way to sort the channel counters is to have the microprocessor 10, as instructed by a ROM or similar device, compare two different channel counters and determine which counter has the smallest value. The channel number corresponding to that channel value is then stored in the first memory position of an ordered channel list. The value of the channel counter corresponding to that channel is compared to another, different channel counter. The smaller of the two compared values is then stored in the first memory position of the ordered channel list. For a cordless telephone with ten channels, all ten values are compared with one another to determine which value is lowest. The channel number corresponding to the lowest value is then stored first in the ordered channel list.

Similarly, the remaining nine values are compared with one another, the lowest value of the nine representing the second clearest channel. The number of the second clearest channel is stored in the second memory position of the channel list.

In this manner, all ten positions of the channel list are occupied in descending order of channel clarity, the channels of least interference beginning the list while the channels of most interference end the list.

In cordless telephones with several available channels, the selection of one channel for use is accomplished by sampling a channel for clarity and if clear, then using that channel for handset/base transmission/-reception. The order in which channels are selected in previous cordless telephones is frequently preset at the factory, with some units having manual channel selection. The present invention usurps this static channel selection arrangement by having the cordless telephone's channel selection means refer to a dynamic and environmentally adaptive channel list.

Channel selection means are currently known with respect to cordless telephones having several available channels. Upon activation, the current invention uses standard channel selection means used by cordless phones for selecting an interference-free channel from among several available channels. However, the list from which, or the sequence in which, the interference-free channel is chosen depends upon the electromagnetic environment local to the cordless telephone as the list or sequence is constructed to preferentially sample statistically clear channels over those statistically less clear.

One way of achieving channel selection means in the current invention is to use the microprocessor 10 to tune the PLL 12 to channels in the order set forth in the generated channel list. The microprocessor's 10 instructions could be stored in a ROM associated with the microprocessor 10 and implemented upon activation of the handset 8 or base 6. The tuned channel is sampled for interference in a similar manner to that used in generating the ordered list. Due to the ordered list, success at finding a clear channel is enhanced as channels at the top of the list (the ones first sampled by the microprocessor 10 upon activation) have been found to be more consistently clear than channels lower on the list. When the microprocessor 10 successfully finds a clear channel, the handset 8 or base 6 can then use that channel for cordless telephonic communications.

In order to select a clear channel as described above, the base 6 and the handset 8 select a first channel from the channel list. If interference if detected on the selected channel, the base 6 and the handset 8 select another channel from the channel list.

Essentially committing the cordless telephone to the selected channel, the microprocessor 10 signals the PLL to tune the transmitter 14 and receiver 16 to operate at the selected channel's frequency or frequencies.

In order to assure that the handset 8 and base 6 choose from the same list, either the handset or base can initially generate the list, then transfer a copy to its counterpart before the handset 8 or base 6 are separated. In this way, identical lists are assured. Such a transfer can be made by signals travelling through any electronic, electrical, or electromagnetic connection or coupling between the handset 8 or base 6. Further, the radio link between handset 8 and base 6 may be used to transfer copies of the ordered list using an error checking communications protocol.

It is conceivable to have both handset and base generating their own lists while separated. In this case, the activated portion of the cordless telephone needs to first establish a communication link with its remote counterpart before engaging in telephonic communications. An advantage of this is that each counterpart of the cordless telephone generates an ordered channel list in response to its local environment. A channel subsequently used would be one generally clear for both handset 8 and base 6, and not just for the local environment surrounding the base-cradled handset.

When separated cordless handset 8 and base 6 units later establish a signal link, the best channel for signal exchange is selected by conventional channel selection means that refer to the sorted channel order stored in the memory storage means 17. Before using one of the channels, that channel is checked for absence of interference. If a predetermined number of channels have a count of zero, the cordless telephone needs to scan only those channels until they experience interference. This method increases the battery life of the cordless telephone substantially by obviating the necessity to scan all the 10 channels continuously.

While the system has been described as prioritizing all of the channels, it is possible to have less than all of the channels prioritized, the system reverting to conventional operation of a scanning cordless telephone thereafter. For example, the system will scan all of the available channels and the three channels having the lowest CQ will be prioritized. When the telephone is activated, those three channels will be checked to see if they are clear. If all three are experiencing interference, then the remaining seven channels would be scanned in the conventional manner. Such a system assures that any malfunction will not interfere with the operation of the cordless telephone and reduce the components required for the device. The information about the preferred channels can be conveyed to the handset by means of any one of the well known communication protocols, and vice-versa.

Alternatively, in order to save battery power in a handset 8 separated from its base 6, another procedure may be used. As an advancement of the three channel method, above, the handset 8 may scan only the single clearest channel of three clearest while the base scans all three clearest channels. The handset 8 signals the base 6 that it is scanning a particular one of the three clearest channels and updates the base 6 when it begins to scan a different channel. If activated first, the base 6 transmits on that channel in order to communicate with the handset 8. If the handset is activated first, it may transmit on any of the three clearest channels as the base 6 is scanning all three of those channels.

Several designs like those described above could strike a balance between channel quality and battery life in the handset 8. Two channels may be scanned by the handset 8 in order to more quickly assure a clear channel, however the battery will power the handset 8 for a shorter period of time before needing recharging.

Although we have described the implementation of the algorithm on the base unit, a similar implementation on the handset would be an obvious and a logical extension and would therefore fall within the scope of the present invention.

What is claimed is:

1. In a cordless telephone having a handset and a base unit, said cordless telephone having multiple channels of reception and transmission, sampling means for sampling the presence of interference from other electromagnetic sources during the standby mode of operation, and channel selection means including storage means for storing an ordered list representing interference associated with each of said channels, the method of selecting a relatively interference-free channel comprising the steps of:
   repeatedly sampling each of the channels;
   storing the number of occurrences of interference associated with each of said channels when sampled and assigning to said channel of cumulative value associated with the likelihood of interference being found on said channel; and
   selecting a channel for receiving or transmitting most likely to not have interference on said selected channel based on said assigned cumulative values.

2. The method of claim 1 in which the step of storing the number of occurrences of interference and assigning to said channel a cumulative value, further comprises:
   assigning a cumulative value based upon the number of occasions that interference is detected on said channel when said channel was sampled.

3. In a cordless telephone, a method for selecting an interference free channel for signal communication between handset and base units of the cordless telephone, the steps comprising:
   sampling at least two channels of said cordless telephone for interference;
   storing cumulative representations of interference detected on said sampled channels in counter means corresponding to said sampled channels;
   sorting said cumulative representations of said counter means in order of recorded interferences;
   generating and storing a list of channel numbers corresponding to said sorted order of said cumulative representations; and
   selecting a channel for cordless telephone signal exchange between said handset and base based upon said sorted channel number list.

4. The method for selecting an interference free channel of claim 3, wherein the step of sampling at least two channels for interference further comprises sampling said at lest two channels for interference while said cordless telephone is in idle mode.

5. The method for selecting an interference free channel of claim 3, wherein said step of storing cumulative representations of interference detected on said sampled channels in counter means further comprises adding a number to said counter means, said number weighted to facilitate selection of an interference free channel.

6. The method for selecting an interference free channel of claim 5, wherein the step of adding a weighted number further comprises:
   adding positive numbers to a higher byte of said counter means when interference is detected on said corresponding channel; and
   adding a negative number to the entirety of said counter means when interference is not detected on said corresponding channel.

7. The method for selecting an interference free channel of claim 6, wherein the step of adding a negative number to said counter means further comprises:
   taking the value of a higher byte of said counter means;
   adding the number one to said higher byte value to get a resulting value; and
   adding the negative of said resulting value to the entirety of said counter means when interference is not detected on said corresponding channel.

8. A multichannel cordless telephone having a base and a handhold transceiver including:
   sampling means associated with said cordless telephone for sampling the frequency bands of a plurality of channels and detecting the existence of interference on each said channel sampled;
   counter means for storing counts corresponding to each channel of said plurality of said channels;
   tuning means for selectably tuning the cordless telephone to one of said channels, said sampling means coupled to said tuning means, whereby said tuned channel may be sampled for interference by said sampling means;

means for changing the count of said counter means coupled to said sampling means and said counter means, said means for changing the count responsive to detection of interference on said channels during said sampling;

comparison means for comparing the value of counts for different channels stored in said counter means and generating an ordered list therefrom, said comparison means coupled to said counter means;

channel selection means for selecting a channel, said channel selection means coupled to said counter means and said ordered list and using said ordered list to select an available channel having the lowest count and in which said counter means stores a value indicative of the number of detected interferences on said channel.

9. A multichannel cordless telephone having a base and a handheld transceiver including:

sampling means associated with said cordless telephone for sampling the frequency bands of a plurality of channels and detecting the existence of interference on each said channel sampled;

counter means for storing counts corresponding to each channel of said plurality of said channels;

tuning means for selectably tuning the cordless telephone to one of said channels, said sampling means coupled to said tuning means, whereby said tuned channel may be sampled for interference by said sampling means;

means for changing the count of said counter means coupled to said sampling means and said counter means, said means for changing the count responsive to detection of interference on said channels during said sampling;

comparison means for comparing the value of counts for different channels stored in said counter means and generating an ordered list therefrom, said comparison means coupled to said counter means;

channel selection means for selecting a channel, said channel selection means coupled to said counter means and said ordered list and using said ordered list to select an available channel having the lowest count and in which said counter means stores a value responsive to the number of occurrences that interference occurs on said channel, said value increasing more with each instance of interference than it decreases with each instance of non interference.

10. A multichannel cordless telephone having a base and a handheld transceiver including:

sampling means associated with said cordless telephone for sampling the frequency bands of a plurality of channels and detecting the existence of interference on each said channel sampled;

counter means for storing counts corresponding to each channel of said plurality of said channels;

tuning means for selectably tuning the cordless telephone to one of said channels, said sampling means coupled to said tuning means, whereby said tuned channel may be sampled for interference by said sampling means;

means for changing the count of said counter means coupled to said sampling means and said counter means, said means for changing the count responsive to detection of interference on said channels during said sampling;

comparison means for comparing the value of counts for different channels stored in said counter means and generating an ordered list therefrom, said comparison means coupled to said counter means;

channel selection means for selecting a channel, said channel selection means coupled to said counter means and said ordered list and using said ordered list to select an available channel having the lowest count and wherein when one of said counts stored in said counter means is decremented, said count is decremented by a number that increases in value with increasing values of said count.

* * * * *